No. 11,783. Reissued Nov. 7, 1899.

T. DUNCAN.

ELECTRIC MOTOR.

(Application filed Oct. 12, 1899.)

WITNESSES:

C. H. Norwood

C. W. Parkhurst.

INVENTOR.

BY Thomas Duncan

Carter & Prance

ATTORNEYS.

UNITED STATES PATENT OFFICE.

THOMAS DUNCAN, OF CHICAGO, ILLINOIS.

ELECTRIC MOTOR.

SPECIFICATION forming part of Reissued Letters Patent No. 11,783, dated November 7, 1899.

Original No. 623,528, dated April 25, 1899. Application for reissue filed October 12, 1899. Serial No. 733,448.

*To all whom it may concern:*

Be it known that I, THOMAS DUNCAN, a citizen of the United States, formerly residing at Fort Wayne, in the county of Allen, in the State of Indiana, and now residing at Chicago, in the county of Cook and State of Illinois, have invented certain new and useful Improvements in Electric Motors; and I do hereby declare that the following is a full, clear, and exact description of the invention, which will enable others skilled in the art to which it appertains to make and use the same, reference being had to the accompanying drawings, which form part of the specification.

My invention relates to improvements in induction power-motors, and particularly to that class in which a revoluble closed armature is actuated by means of two magnetic fields differing in phase and supplied from a single-phase source of alternating currents.

The principal object of the present invention is the production of a motor in which the two magnetic fields will be ninety degrees apart, thereby resembling in this feature a two-phase motor requiring a two-phase system for its successful operation.

It is now recognized in the art that the most efficient type of induction-motor is the polyphase motor which requires a polyphase system of alternating currents for its successful operation; but since there are a great many single-phase plants in which it is impossible to economically or successfully utilize these polyphase motors there is a growing demand for a motor having similar phase relations to those of a quarter-phase motor, but which is adapted to single-phase supply systems instead of quarter-phase.

Figure 1:
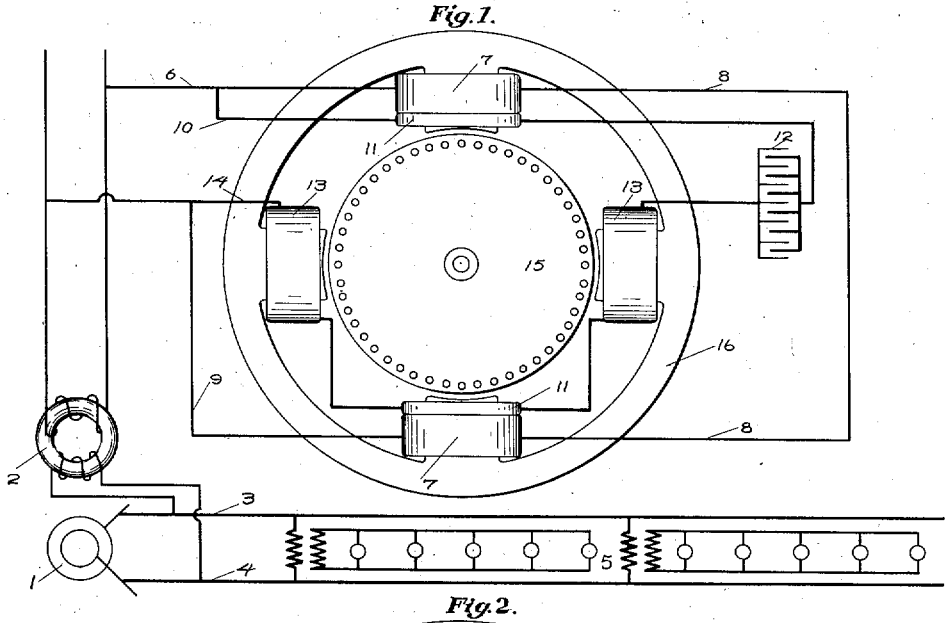
Figure 2:
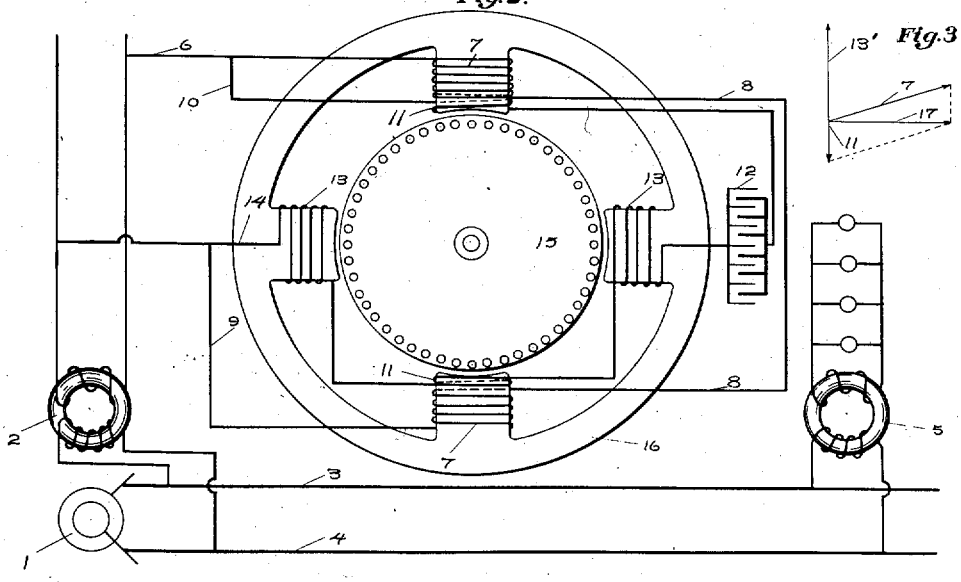
Figure 3:
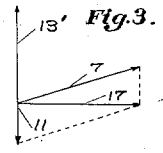

In the accompanying drawings, forming part of this specification, Figure 1 is a plan view of my invention as applied to a four-pole motor. Fig. 2 is a diagrammatic view of Fig. 1, showing the various windings of the field-coils. Fig. 3 shows diagrammatically the phase relations of the various currents which actuate the armature, the same to be hereinafter more fully described.

Referring now to the accompanying drawings, a generator 1 is shown for supplying current to the primary mains 2 and 3 for the translating device 5, and a transformer 2 is also shown as supplying current to my improved motor. My motor has a suitable field-magnet 16, arranged, as shown, with four projecting pole-pieces of ordinary construction. These pole-pieces are shown as diametric to the armature and at right angles in the present drawings; but obviously a greater number of poles may be employed, depending upon the size of the motor and the rate of alternations of the system. Upon the horizontal projecting poles I employ suitable coils 13 in series with a condenser 12. Upon the other diametrically opposite poles are arranged the coils 7 and 11, the coils 11 having a smaller number of turns relatively to the coils 13. The said condenser 12 is so adjusted that its capacity just neutralizes the self-induction of the said coils 11 and 13, or, in other words, until the current through the said coils 11 and 13 is in phase with the line electromotive force of the transformer 2. The magnetism of this current which is in step or phase with its electromotive force is represented in Fig. 3 by the line 13′, and a ninety-degree lag is obtained by my improvement in the magnetism of the poles carrying the said coils 7 and 11, as follows: There being little or no capacity in the circuit 9, 8, and 6, the presence of the iron pole-pieces as cores to the said coils 7 gives the current through these coils a lag which may have such an angle as is shown in Fig. 3 by the line 7, or an angle of about seventy degrees behind the current and magnetism of the coils 13, and to make the magnetism of the coils 7 reach ninety degrees or quadrature I wind upon the same pole-piece with them a second coil 11, whose current is in phase with the line-pressure, as hereinbefore set forth. The convolutions of these coils 11 are wound in an opposite direction to those of the coils 13, and the magnetism produced by the said coils 11 is shown in Fig. 3 by the line, and by completing the parallelogram with the two remaining dotted lines the resultant line 17 represents the combined magnetism of the coils 7 and 11. This gives a true two-phase field or two magnetizations in quadrature, one being in phase with the electromotive force and the other being ninety degrees behind it. These magnetizations combine into a rotary magnetic field adapted to actuate the revoluble armature 15. It is not necessary that the current and magnetism of the coils 13 be in phase with the electromotive force; but it may be either slightly ahead or behind the same, in which case the turns of the coil 11 may be proportioned to adjust the magnetism of the said coils 7 and 11 to quadrature irrespective of the line electromotive force.

The coils 13 and 11 and the condenser 12 are connected to the circuit with the wires 10 and 14, and the other magnetizing-circuit is connected with its coils 7 by the wires 6 and 9.

The drawings represent a motor experimentally adjusted without having any variable-resistance or choke coils in any of the circuits; but obviously should any of these auxiliary adjusting devices be desirable or necessary they can be used in any well-understood manner without departing from the spirit and scope of my invention.

Having thus described my invention and the manner of employing the same, what I desire to secure by Letters Patent is—

1. In a motor for single-phase alternating currents, the combination of a plurality of poles arranged as shown; the coils 13 mounted upon one half of said poles in diametric arrangement as set forth; the phase-lagging coils 11 in series with the said coils 13 and mounted upon the other half of said poles as shown; a condenser in series with the said coils 11 and 13, the coils 7 mounted upon the same poles as the said coils 11 and in coöperative relation therewith; and a revoluble closed-circuited armature, arranged in inductive relation to said energizing-coils.

2. In a two-phase induction-motor for single-phase alternate currents, the combination of a field-frame provided with a plurality of inwardly-projecting peripheral pole-pieces; magnetizing-coils 13 wound upon one half of the said pole-pieces; the phase-lagging coils 11 connected in series with the said coils 13 and mounted or wound upon the other half of said pole-pieces; a condenser in series with the said coils 11 and 13; the magnetizing-coils 7 receiving current from the same source as the said coils 11 and 13, and mounted upon the same pole-pieces as shown and in coöperative relation with the said phasing-coils 11 for the purpose set forth, the magnetism of the said coils 7 and 11 being adapted to form a resultant that is ninety degrees behind the magnetism of the said coils 13; and a revoluble armature actuated by the resultant rotating magnetic field of the said coils 13, 7 and 11.

In testimony that I claim the foregoing as my invention I affix my signature, in the presence of two subscribing witnesses, this 3d day of October, 1899.

THOMAS DUNCAN.

Witnesses:
WILLIAM F. MEYER,
DAYTON N. PETTIT.